April 15, 1930.    F. H. BLAKESLEE    1,754,346
PNEUMATIC SHOCK ABSORBER
Filed March 14, 1927
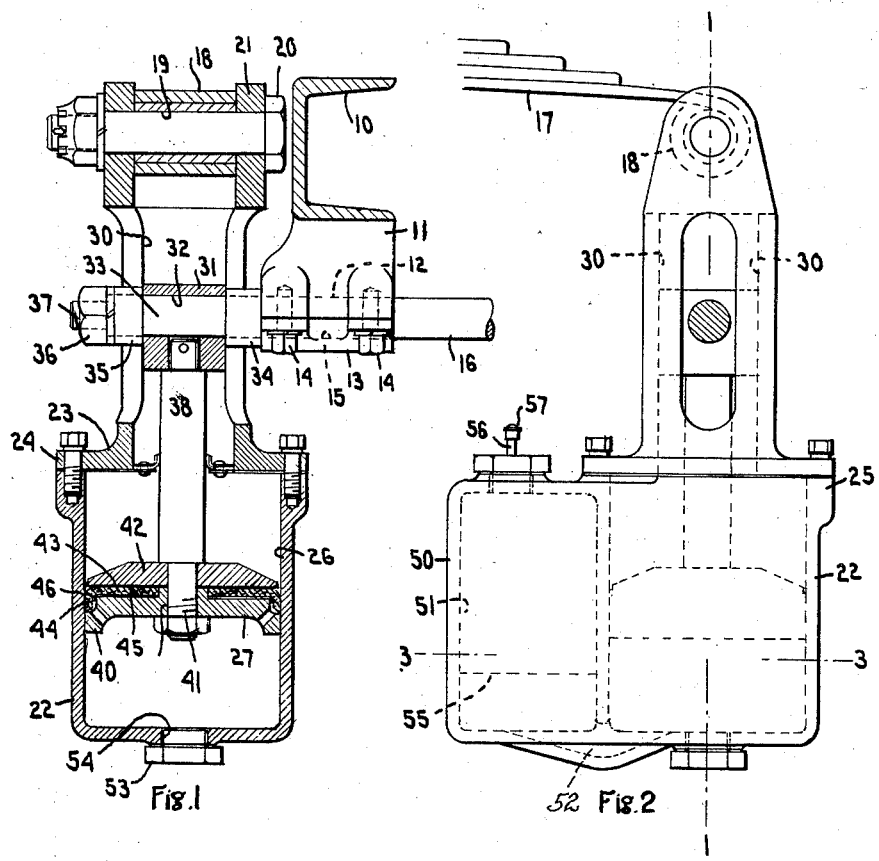
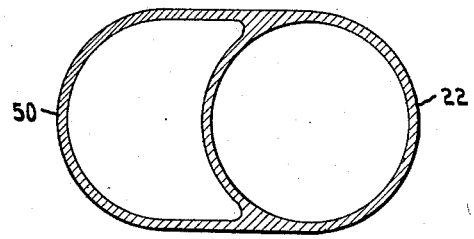
Fig.3
INVENTOR.
Frank H. Blakeslee
BY
ATTORNEYS.

Patented Apr. 15, 1930

1,754,346

UNITED STATES PATENT OFFICE

FRANK H. BLAKESLEE, OF CLEVELAND, OHIO

PNEUMATIC SHOCK ABSORBER

Application filed March 14, 1927. Serial No. 175,113.

This invention, as indicated, relates to pneumatic shock absorbers and refers more particularly to an improved fluid pressure device which is adapted to be attached between a vehicle frame and the end of the spring in the place of the usual spring shackle. An object of the present invention is to simplify the construction of devices of this general character and to provide a shock absorber which will be very efficient in operation over a long period of usage.

To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a vertical longitudinal sectional view through the present novel shock absorber as taken on line 1—1 of Fig. 2; Fig. 2 is a side elevational view of the present device mounted in place; and Fig. 3 is a transverse section of the cylinder chamber taken on line 3—3 of Fig. 2.

In the illustrated embodiment of my invention I have shown the present improved shock absorber as being attached between the end of a spring and a vehicle frame, it being obvious, however, that suitable connections may be employed to mount this shock absorber in various ways as between the ends of two springs. The vehicle chassis frame indicated at 10 in Fig. 1 is shown as being provided with a downwardly extending boss 11 which provides in its under surface a transverse socket 12. A cap 13 is removably secured by bolts 14 to the boss 11 and has in its adjacent surface a complementary recess or socket 15 which, together with the socket 12, form a bearing for a shaft or rod 16. This rod 16 carries at its outer end, as will appear hereinafter, certain of the operating elements of my shock absorber.

The vehicle spring is indicated at 17 and has one of the leaves thereof provided at its extremity with the usual spring-eye 18 in which may be mounted a suitable bearing 19. Mounted in such bearing is a bolt 20 by which an extension 21 of a cylinder 22 is secured to the vehicle spring. This extension 21 is formed vertically upon the upper side of the cylinder and is here shown as being made separate from such cylinder. The lower end 23 of the extension 21 is provided with an annular flange 24 which is adapted to be bolted to an annular seat 25 provided on the upper surface of the cylinder 22. The interior of the cylinder is formed with an internal circular vertical bore 26 in which is adapted to be slidably mounted a piston mechanism 27, the open upper end of the bore being closed by the flange 24.

Mounted within vertical guide-ways 30 formed between the sides of the cylinder extension 21 is a sliding block 31 having a transverse hole 32 therethrough in which is received the outer end 33 of rod 16. Spacer members 34 are provided to properly position such block 31 away from the outer surface of the boss 11 and other spacers 35 and a lock nut 36 may be provided on a threaded portion 37 of the rod 16 to lock the parts in assembled relationship. Depending downwardly from the block 31 is a stub shaft or bolt 38 which is arranged centrally of the cylinder bore 26 and carries at its lower end the piston mechanism 27. The piston proper, as shown in Fig. 1, consists of an annular disc having its outer periphery 40 formed to slidably engage the bore 26 and its central portion suitably apertured to receive the lower end 41 of the bolt 38. Also carried by the bolt 38 above the piston 40 is a second annular disc 42 and confined between such disc and the piston is a cylindrical packing washer 43. This latter member may be constructed of leather or the like and has a lateral circular flange 44 formed at its outer edge to conform with the interior of the cylinder 22.

Formed integrally with the cylinder casing at one side of the bore 26 is an extension 50 constituting a hollow chamber 51. The lower ends of both the chamber 51 and the cylinder bore 26 are connected by a passageway 52 which may be of constricted crosssection to prevent too free a passage of the liquid utilized in the present shock absorber as will presently appear. A threaded plug 53 is provided to close an aperture 54 formed in the lower portion of the cylinder 22 through which aperture the liquid is introduced into the interior of the cylinder at the time of assembly.

As indicated above, this invention intends to supply a certain amount of fluid within the cylinder chamber and to utilize this fluid in connection with the reciprocations of the piston 27 to cushion or break the sudden movements imparted thereto as by the relative movement of the vehicle axle and spring with relation to the vehicle frame. This liquid is carried within the chamber 22 beneath the piston 27 and to a predetermined level within the chamber 51, this level being indicated in Fig. 1 at 55. At the upper end of the extension 50 communicating with the chamber 51 is mounted a valve structure 56 having a removable cap 57 thereon. This valve 56 may be of any desired form but is here shown as of the ordinary "Schrader" type valve such as employed in connection with vehicle tires. To offset the downward pressure of the piston 27 upon the liquid, air is pumped into the chamber 51 through the valve 56 which serves to cushion the action of such piston. The amount of pressure of the air within the chamber 51 may, of course, be varied to suit many conditions. In this way the shock absorber may be adjusted to obtain a very high degree of efficiency.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a shock absorber, the combination of a vertical cylinder, an extension on the upper end thereof, means for connecting said extension to a vehicle spring eye, a piston mounted in said cylinder, means guided by said extension and secured to said piston for connecting the latter to the vehicle frame, said means being positioned between the spring eye connection and said piston, a lateral extension at one side of said cylinder providing a hollow chamber, a passageway communicating said chamber with the interior of the cylinder, means including a liquid column acting against the bottom of said piston, and means for maintaining said liquid column under pressure in said chamber.

2. In a shock absorber, the combination of a vertical cylinder open at its top end, an extension removably secured to said open end, said extension having guides formed between the sides thereof, means for connecting said extension to a vehicle spring eye, a block slidably mounted in said guides, a piston carried in said cylinder and connected to said sliding block, means for attaching said sliding block to the vehicle frame, and means including a liquid column under pressure acting upon the lower side of said piston.

3. In a shock absorber, the combination with a vehicle frame provided with a transverse socket, a rod mounted in said socket, a vehicle spring, a vertical cylinder attached at its upper end to such spring, a piston mounted in said cylinder and secured to said rod, a lateral extension on said cylinder providing a hollow chamber, a passageway communicating with the interior of the cylinder, and means including a liquid column under pressure carried in said chamber and acting upon the under side of said piston.

Signed by me this 12th day of February, 1927.

FRANK H. BLAKESLEE.